(No Model.)
J. McKINLEY.
MERCANTILE CHECK AND ADVERTISING BOOK.
No. 513,436. Patented Jan. 23, 1894.
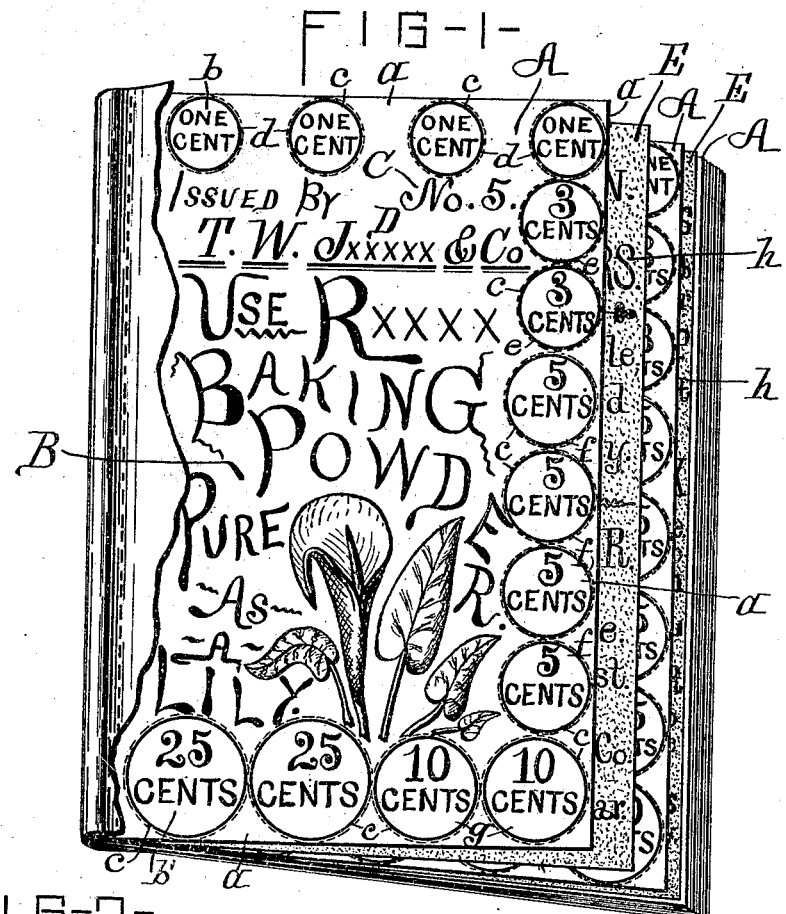
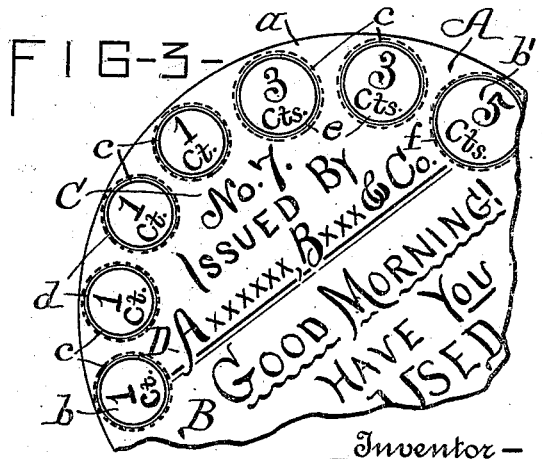
Witnesses —
C. E. Stoddard
Chas. N. Marvin
Inventor —
Judson McKinley,
By Wm. E. Raymond
his Attorney

UNITED STATES PATENT OFFICE.

JUDSON McKINLEY, OF LIVERPOOL, NEW YORK, ASSIGNOR TO SARAH AMELIA McKINLEY, OF SAME PLACE.

MERCANTILE CHECK AND ADVERTISING BOOK.

SPECIFICATION forming part of Letters Patent No. 513,436, dated January 23, 1894.

Application filed February 9, 1893. Serial No. 461,702. (No model.)

*To all whom it may concern:*

Be it known that I, JUDSON McKINLEY, a citizen of the United States, residing at Liverpool, in the county of Onondaga and State of New York, have invented certain new and useful Improvements in Mercantile Check and Advertising Books; and I do hereby declare the following to be a full, clear, and exact description of the invention, such as will enable others skilled in the art to which it appertains to make and use the same, reference being had to the accompanying drawings, in which—

Figure 1 is an isometric plan view of my improved mercantile check and advertising book, representing the forward cover partially broken away and the first few of the bound leaves thereof so separated or opened out as to sufficiently show the salient features of my invention. Fig. 2 is a fragmentary detail illustrating a modification in the outline form of a book leaf; and Fig. 3 represents a further variation in the outline form of a leaf.

Similar letters of reference indicate substantially corresponding parts in the several views of the drawings.

My invention has reference to that character of books or pamphlets designed as a check or coupon pass book or trading book, for the conjoint utilization and benefit of merchants (particularly those engaged in a retail business) and their customers, dispensing with the employment of customary pass-books, and other books and procedure invariably entailed in the transaction of a credit (or even cash) business carried on in accordance with old time methods.

The object or purpose of my invention is the production of a book pertaining to the purposes aforementioned, of improved construction and utility, wherein the advantages and usefulness of a combined checking register for merchants and their customers and an advertising medium for the wares or goods of said merchants or special manufacturers is afforded within one device; also the incorporation of the check marks or values in conjunction with advertising matter in such novel and effective manner that one feature cannot be observed by the user of the book without equal notice of the other; wherein the varied valuation figures or emblems representative of similar or varying amounts of money or money values are so disposed on the leaves or sheets as to admit of ready observation, and easy and expeditious cancellation by canceling or other satisfactory means for depriving same of value; in the alternating of the check-leaves by the interposition between them of sheets or leaves devoid of checks or value representations; and in other novel and useful features of its detail construction, necessarily imparting increased efficiency, value, practicability and simplicity thereto, and insuring practically equal prominence to both the checks and advertising matter embodied in the book; and also by reason of its novel arrangement serving as a safe-guard against cancellation of, or unobserved cancellation of checks or money emblems on two contiguous check-leaves concurrently, through accident or carelessness.

My invention consists in the novel features of construction, arrangement, and combination of co-relating parts hereinafter described, and concisely enumerated in the clauses of claim hereto annexed.

The construction and arrangement of my mercantile check and advertising book is substantially as follows:

A indicates check or valuation leaves attached together at or adjacent contiguous edges thereof, having on one and similar sides (or faces) bordering their boundary edges as denoted at $a$, checks or money representation marks or emblems of varied denomination, imprinted, stamped or otherwise affixed thereto, the numerals or letters indicating the varied valuation symbols preferably starting at one extreme point contiguous the boundary edge of a leaf with low denominators of value and gradually increasing in value to the terminating point of the row of the check representatives of money values, as indicated by $b, b'$. By choice the several distinct checks formed by figures or letters or both forming collectively the full series on each check leaf, are provided with a border circular or otherwise, or other encircling or separation marks to render the respective denominators of money entirely distinctive one from the other, as is generally designated by the reference letter c, whereby the eye of the owner of the book or the merchant may readily distinguish each check of similar or differential valuation. Preferably I further add to the ease and readiness whereby both the customer (normal possessor of the book), and the merchant, may be enabled to expeditiously locate in a comprehensive manner checks denominating a low, medium or high money-representative value, by so arranging the borders or other lines about the check emblems, that the checks indicative of the lowest valuation are inclosed by the smallest sized circle or other confining marks, and each check or checks of a higher amount having a circle or other border mark of greater diameter, size or thickness, the size of the checks gradually increasing as the monetary value represented is increased, the checks designating corresponding sums having similarly sized borders or other distinguishing marking about them; the aforementioned arrangement being partially indicated by the letters d, e, f, g.

In the space of each check leaf bordered by the checks of gradually increasing values there is printed any desired mercantile advertisement, either in characters and pictorially conjointly, (or in one or the other alone,) as indicated at B, while above the advertisement there is placed, by preference, the number of the book, and the mercantile firm whereby it is furnished to the customer, as noted at C, D. Usually the series of checks on a page or rather leaf aggregate a certain definite sum total, as for instance, one dollar, two dollars or other predetermined amount. The checks shown in the book illustrated in Fig. 1 aggregate, to each leaf, when added together the sum of one dollar, and which is merely delineated as representing a total of such amount by way of exemplification. Preferably all the check-leaves in a particular book represent sums of corresponding value and the total of each check leaf or page aggregating like sum totals, as is sufficiently brought out in the representation of my book, Fig. 1. However said arrangement may be varied more or less as seemingly desirable.

My object in having the checks symbolic of different and varied monetary values so arranged as to border the edges of the forward page of each checking leaf is, to afford ready access of a ticket punch or other canceling device thereto, besides insuring a central and prominent space for the printing of advertising matter in such a location as to insure its being noticed by the customer using the book; a very important and advantageous feature of my device.

While cancellation by a punch of the monetary checks is my preferred and customary manner of cancellation thereof, still, as is obvious, other means are susceptible of utilization for canceling by disfigurement or otherwise the checks as requisite, as for instance by the use of a pen, rubber stamp, &c.; while in case the boundaries of the valuation checks should in the preparation of the book be slightly perforated, as is admissible, the value of checks may be obliterated by ready removal or detachment thereof from the body of the leaf or leaves. By preference cancellation by means of a ticket-punch is employed by me as it is handy and readily performed, and moreover insures the retention on the leaves of the slightly mutilated apertured checks affording merchant or customer opportunity to quickly figure at any time the check values that are no longer valid, and those which are still of value by reason of no punch apertures therein. The check-leaves I preferably form of rather thick paper, while the leaves E interposed between the check-leaves and causing alternation thereof, are preferably of thinner paper and pebbled, mottled or of a different color from the check-leaves, whereby the check leaves may instantaneously be distinguished from the interposing subsidiary leaves E before described. These protective leaves E preferably have advertising matter or other reading matter upon their forward face as indicated by the letter h.

The leaves E of different appearance from the check-leaves A enable the merchant or merchant's clerk who is canceling checks to readily distinguish each individual check-leaf, and thereby being but little likelihood of his accidentally punching through two check leaves concurrently, and in case two leaves might happen to be grasped for punching, obviously the second leaf being a protective leaf E. punch holes therein, coincident with the forward contiguous check leaf, or through the forward check-leaf, adjacent protective leaf and following check-leaf would at once demonstrate the punch-holes in the protective leaf and rearwardly following check-leaf was accidental, and that the only checks calculated to be cancelled at the time, and rightfully cancelled, were those on the check leaf preceding the differently appearing protective leaf E.

An additional safeguard against the accidental or careless punching of two check-leaves concurrently, resides in the fact that the check-leaves being thicker than the protective or guard-leaves, one may readily be distinguished from the other through the sense of touch in fingering the leaves of my book.

In Fig. 2, of the drawings I illustrate a modification in the shape of a leaf, also another variation in Fig. 3; the purpose being simply to exemplify that the leaves entering into the arrangement of my combined mercantile check and advertising book, may be of any preferred form; also as is evident the same may be attached in any desired or advantageous manner.

The value, efficiency and desirability of my device as a book for mercantile use combining in one article a checking and advertising medium of service and assistance to both merchant, customer and advertiser, is readily apparent, and the advantages entailed are clearly observable.

Obviously my invention is susceptible of more or less modification in minor details without involving a departure from the full scope or intent thereof.

Having described my invention, what I claim as new, and desire to secure by Letters Patent, is—

A check and advertising book, consisting of a series of pages of thick material provided with advertising matter in their center portions, and spaces around their edges marked to indicate certain coins, in combination with a series of pages of thin material interposed between the aforesaid pages and adapted to guard against the accidental punching of two superposed coin spaces, substantially as set forth.

In testimony whereof I affix my signature, in presence of two witnesses, this 23d day of January, 1893.

JUDSON McKINLEY. [L. S.]

Witnesses:
WM. C. RAYMOND,
CHAS. W. MARVIN.